No. 859,850. PATENTED JULY 9, 1907.
L. SLIGA.
TABLE SERVICE WARE.
APPLICATION FILED APR. 20, 1907.

ATTEST.
C. M. Fisher
V. E. Fisher

INVENTOR
Lena Sliga.
BY Fisher & Moser, ATTYS.

UNITED STATES PATENT OFFICE.

LENA SLIGA, OF CLEVELAND, OHIO.

TABLE-SERVICE WARE.

No. 859,850.   Specification of Letters Patent.   Patented July 9, 1907.

Application filed April 20, 1907. Serial No. 369,370.

*To all whom it may concern:*

Figure 1:
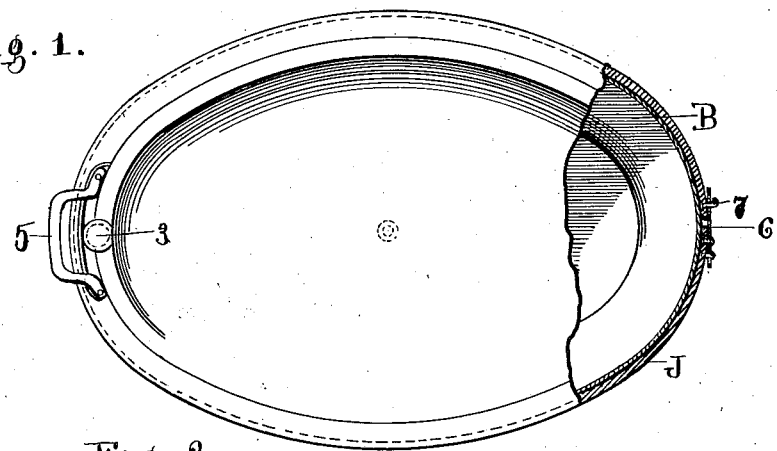
Figure 2:
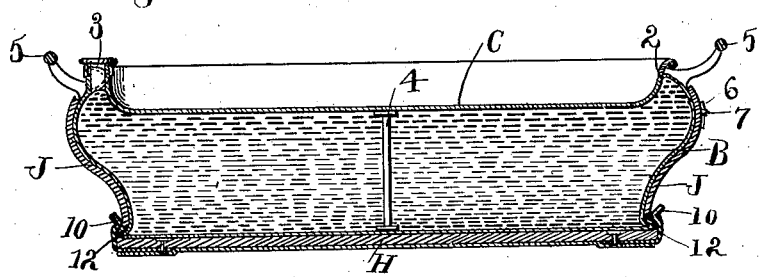
Figure 3:
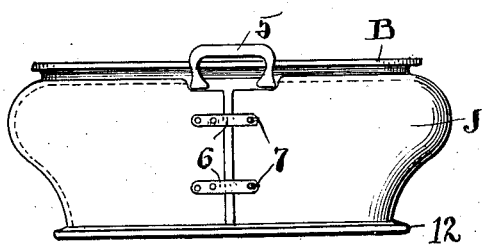
Figure 4:
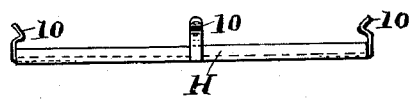

Be it known that I, LENA SLIGA, a citizen of the United States, residing at Cleveland, in the county of Cuyahoga and State of Ohio, have invented certain new and useful Improvements in Table-Service Ware; and I do declare that the following is a full, clear, and exact description of the invention, which will enable others skilled in the art to which it appertains to make and use the same.
This invention relates to table service ware, and the object of the invention is to provide a table service vessel which is adapted to receive hot water to keep warm a dish of food set therein, all substantially as shown and described and particularly pointed out in the claims.
In the accompanying drawings, Figure 1 is a plan view of the vessel partly broken away at one side, and Fig. 2 is a vertical sectional elevation thereof. Fig. 3 is an end elevation, and Fig. 4 is an edge view of the separate and removable non-conducting base for the vessel.
B represents the body of the vessel, which may be of any suitable ware, say agate or other enamel ware, and is designed to be of ornamental shape and style so as to be an acceptable article of table furniture. The cover or top of the vessel is substantially dish or platter shaped, having a flat bottom and raised edge sealed water tight about the same at 2 by the top inturned edge of body B, so that said body and top are rigid with each other and water cannot leak out between them. It will be noticed that the meeting edge 2 comes up on the side of the dish shaped top so that said top will rest down in the water about its edge also, when the vessel is full, and a suitable filling hole 3 is provided which may be closed by stopper or otherwise. Either heated water can be poured into the vessel, or the water can be heated in the vessel on the stove. A central brace 4 sustains the bottom of top or pan C. Handles 5 are provided, and an asbestos or other non-conducting jacket J, which fits neatly about body B and serves to confine the heat. Said jacket is remov-
able, and has spring straps 6 at one end and hooks 7 at the other end adapted to be engaged by said straps, and by which the said jacket is tightly buttoned about body B.

H represents a false bottom of asbestos-board or other non-conducting material which is removably secured to the bottom of the vessel by spring clamps 10, or their equivalent, adapted to engage over or upon the bead or rib 12 about the bottom edge of the vessel.

Both jacket J and bottom H are removed when the vessel is cleansed, and both serve together to confine the heat in the water while bottom H serves the further or additional purpose of protecting the table. Of course, an outer cover for the vessel may be used if desired, so as to cover over the dish or food set into the vessel to keep it hot.

The central brace 4 is material to keep the bottom C from sagging or buckling and to maintain the level of said bottom.

Obviously, the shape or contour of the vessel may be round or even rectangular with different shaped sides from that shown without departing from the spirit of the invention.

What I claim is:—

1. A table service vessel having a hot water chamber and a bottom edge projecting outward beyond the side of the vessel all around, in combination with a removable insulating pad provided with spring catches engaged over said bottom edge.

2. A table service vessel having an internal heating chamber and a top adapted to place dishes thereon, in combination with a removable insulating jacket about the side of the vessel and a removable pad engaged upon the edge of the bottom of said vessel.

In testimony whereof I sign this specification in the presence of two witnesses.

LENA SLIGA.

Witnesses:
 R. B. MOSER,
 F. C. MUSSUN.